United States Patent [19]

Lukhvich et al.

[11] 4,336,498

[45] Jun. 22, 1982

[54] MAGNETIC THICKNESS GAUGE

[76] Inventors: Alexandr A. Lukhvich, ulitsa A.Kulman, 15, kv. 18; Valery A. Rudnitsky, ulitsa Slavinskogo, 35, kv. 36; Ivan I. Linnik, prospekt Partizansky, 32, korpus 1, kv. 91; Genrikh B. Gavris, Leninsky prospekt, 127, kv. 265, all of Minsk, U.S.S.R.

[21] Appl. No.: 60,205

[22] Filed: Jul. 24, 1979

[51] Int. Cl.$^3$ .................. G01B 7/10; G01R 33/12
[52] U.S. Cl. ................................................. 324/230
[58] Field of Search ........................... 324/229–231

[56] References Cited

U.S. PATENT DOCUMENTS

| 3,521,160 | 7/1970 | Nix et al. | 324/230 |
| 3,716,779 | 2/1973 | Akulov | 324/230 |

FOREIGN PATENT DOCUMENTS

| 134882 | 1/1960 | U.S.S.R. | 324/230 |

*Primary Examiner*—Gerard R. Strecker
*Assistant Examiner*—Walter E. Snow
*Attorney, Agent, or Firm*—Fleit & Jacobson

[57] ABSTRACT

An apparatus for gauging the thickness of coatings on metal products, whose casing accommodates: a wheel system; a spring actuator having a means for its being wound up, said actuator being connected to one of the members of said wheel system for said system to rotate; two balanced levers the first one of which carries a gauging permanent magnet adapted to interact with a ferromagnetic coating of the product being gauged or with the base thereof in case of a non-magnetic coating while the second lever is adapted to interact with said first balanced lever in cases where the break away force of the first balanced lever is not high enough to breakaway said gauging permanent magnet from the product being gauged; two coiled springs of which one spring is connected, to said first balanced arm, and to one of the shafts of said wheel system, whereas the other coiled spring is connected, to said second balanced lever, and to said casing in such a manner as to adjust the spring tension; a magnetic element attached to said housing and adapted to attract said gauging permanent magnet. The apparatus is also provided with a reset lever for said first balanced lever. Said reset lever is locked-in with the central shaft of said wheel system, said shaft carrying a pointer to indicate the gauged thickness.

1 Claim, 2 Drawing Figures

MAGNETIC THICKNESS GAUGE

BACKGROUND OF THE INVENTION

1. Field of the Invention

The present invention relates to magnetic gauging systems and more specifically to an apparatus for gauging the thickness of coatings on metal products.

The present invention is applicable for gauging the thickness of nickel coatings on a ferromagnetic or nonmagnetic base, as well as for gauging the thickness of nonmagnetic coatings on a ferromagnetic base.

2. Description of the Prior Art

Known in the present state of the art is an apparatus for gauging the thickness of coatings on metal products, based on gauging the force of attraction of a permanent magnet to the product being gauged (cf. U.S. Pat. No. 3,716,779, Cl. 601 B). Said apparatus comprises a casing which accommodates a wheel system; a spring actuator linked to one of the members of said wheel system to impart rotation thereto; two levers, independently balanced in a static state, the first of which carries a gauging permanent magnet adapted to interact, by virtue of its field, with the ferromagnetic coating of a product or with a base thereof in case of a nonmagnetic coating, while the second lever is adapted to interact with the first balanced lever in cases where the pulling force of the latter lever is not high enough for the gauging permanent magnet to break away from the product being gauged; two coiled springs, the first of which is connected, through one of its ends, with the first balanced lever and through its other end with one of the shafts of the wheel system, whereas the second coiled spring with one of its ends is connected with the second balanced lever and through the other end thereof, with the casing in such a manner as to adjust the tension of the spring; a magnetic element attached to the casing so as to attract the product being gauged; a reset lever to return the first balanced lever into the initial position, said lever being locked-in with the central pivot shaft of the wheel system, said shaft carrying the winding knob and a pointer to indicate the gauged thickness on the circular scale rigidly fixed in position on the casing.

When winding up the apparatus by rotating the winding knob on the central shaft of the wheel system, the end of the gauging permanent magnet goes beyond the bearing plane of the apparatus casing, whereupon the wheel system is locked.

Upon putting the gauge onto the product to be gauged the end of the gauging permanent magnet gets flush with the bearing surface of the casing, the wheel system starts rotating under the action of the spring actuator, with the result that the former coiled spring is twisted until the gauging permanent magnet is broken away from the product being gauged. At the instance of break away of the gauging permanent magnet the first balanced lever rotates round its axis, and the brake spring fixed thereon stops rotation of the brake wheel incorporated into the wheel system of the apparatus, and thus stops the entire wheel system.

Once having been broken away from the product being gauged, the gauging permanent magnet is attracted by the magnetic element, thereby affording more reliable braking.

The afore-described known apparatus is capable of gauging a broad range of coating thicknesses due to the provision of a second balanced lever with an adjustable spring tension.

However, said apparatus offers some difficulties when winding up by rotating the winding knob whose torque is not adjustable.

It is therefore a primary object of the present invention to provide an apparatus for gauging the thickness of coatings on metal products having such a constructional arrangement of the winding up means thereof that would provide rapid and convenient winding up of the apparatus and would increase its efficiency.

SUMMARY OF THE INVENTION

The essence of the present invention resides in that in an apparatus for gauging the thickness of coatings on metal products whose casing accommodates the following components: a wheel system; a spring actuator provided with a means for its winding up, said actuator being connected with one of the members of the wheel system for said system to rotate; two balanced levers, the first of which carries a gauging permanent magnet adapted to interact, by virtue of its field, with a ferromagnetic coating of the product being gauged or with the base thereof in case of a nonmagnetic coating, and a second lever is adapted to interact with the first balanced lever in cases where the break away force of the latter lever is not high enough to break away the gauging permanent magnet from the product being gauged; two coiled springs the first of which is connected, through one of its ends, to the first balanced lever and through its other end, to one of the shafts of the wheel system, whereas the other coiled spring is connected, through one of its ends with the latter balanced lever and through the other end thereof with the casing in such a manner as to adjust the tension of the spring; a magnetic element attached to the casing and adapted to attract the gauging permanent magnet after its having been broken away from the product being gauged; a reset lever to return the first balanced lever into the initial position, said lever being locked-in with the central shaft of the wheel system, said shaft carrying a pointer to indicate the gauge thickess on a circular scale rigidly fixed in position on the casing, according to the invention the means for winding up the spring actuator comprises a lever locked-in with an intermediate member adapted to get in mesh with the spring actuator, and a spring-actuated frame mounted on the casing traversably with respect thereto and adapted to contact the free end of the lever while traversing so as to turn the latter.

Such a constructional arrangement of the means for winding up the spring actuator renders the gauge operationally reliable, provides for its rapid and convenient winding which increases the efficiency.

Given below is a detailed description of a specific illustrative embodiment of the present invention presented by way of illustration with reference to the accompanying drawings, wherein:

DETAILED DESCRIPTION OF THE DRAWINGS

Figures 1, 2:
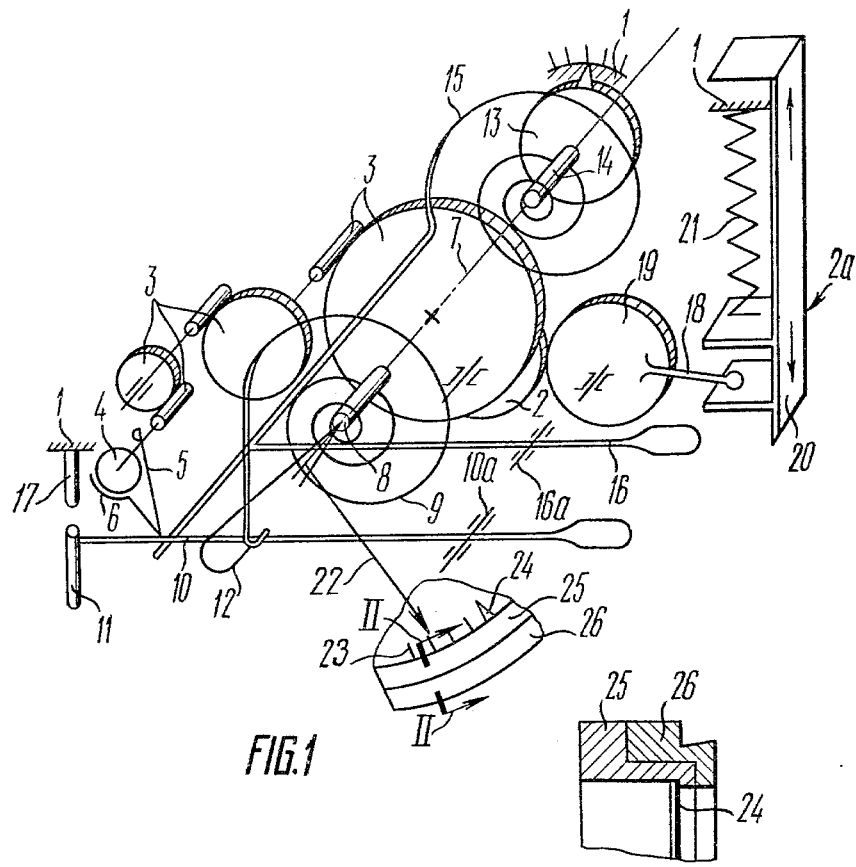
FIG. 1 is an isometric schematic view of an apparatus for gauging the thickness of coatings on metal products, according to the invention.
FIG. 2 is a scaled-up view of a section taken along the line II—II in FIG. 1.

The herein-proposed apparatus on gauging the thickness of coatings on metal products comprises a casing 1 (FIG. 1) accommodating a spring actuator 2 with a means 2a for its winding up, said spring actuator being connected with one of the members of the wheel system so as to impart rotation thereto, said wheel system consisting of a train of gears 3 and a brake wheel 4. The braked wheel 4 is locked by means of a pin 5 and a brake spring 6. A central shaft 7 of the wheel system carries a block 8 rigidly set at one of the ends thereof and adapted for the inner end of a first coiled spring 9 to hold, the outer end of said spring being attached to the end of a first lever 10. The same end of the first balanced lever 10 mounts the pin 5 with the brake spring 6 and a gauging permanent magnet 11 (which is in fact the sensitive element of the apparatus), adapted to interact, by virtue of its field, with the ferromagnetic coating of the product being gauged (not shown), or with the base of said coating if it is a nonmagnetic one. To bring the first balanced arm 10 into the initial position a reset lever 12 is rigidly set on the central shaft 7.

The opposite end of the central shaft 7 carries a means for adjusting the spring tension set coaxially with the shaft and made as a flywheel 13 with a bush (not shown), whereon a block 14 is set rigidly, carrying the inner end of a second coiled spring 15 fixed in place thereon, whereas the outer end of said spring is held to the end of a second lever 16. The same end of the second balanced lever 16 has a bent-away arm adapted to interact with the first balanced lever 10. Both of the levers 16 and 10 are free to rock about fulcrums 16a and 10a with respect to which said levers are balanced.

Provision is made in the apparatus for a magnetic element 17 made fast on the casing 1 some distance away from the gauging permanent magnet 11 coaxially therewith and adapted to attract the latter after its having been broken away from the product being gauged.

The means 2a for winding up the spring actuator 2 comprises a lever 18 locked-in with an intermediate member 19 adapted to get in mesh with the spring actuator 2, and a spring-actuated frame 20. The spring actuated frame 20 is mounted on the casing 1 opposite to the gauging permanent magnet 11 traversably with respect to the casing from the initial position illustrated in FIG. 1. While traversing the spring-actuated frame 20 is adapted to contact the free end of the lever 18 so as to turn the latter. A coil spring 21 is provided between the walls of the casing 1 and of the frame 20, adapted to return the frame 20 into the initial position.

The apparatus readings are taken by means of a pointer 22 set on the central shaft 7 of the wheel system on the side of the block 8, from a circular scale 23.

The apparatus for gauging the thickness of coatings on metal products operates as follows.

When the spring-actuated frame 20 moves upwards with respect to the apparatus casing 1 as indicated by the arrows in FIG. 1 the lever 18 is caused to turn due to its being in contact with said frame 20. As a result rotary motion is imparted to the intermediate member 19, the spring actuator 2, the train of gears 3 of the wheel system, the pointer 22 set on the central shaft 7, the return lever 12, while the coil spring 21 gets compressed.

The train of gears 3 of the wheel system, as well as the brake wheel 4 keep rotating until the pin 5 thrusts against the brake wheel 4. As a result the free end of the gauging permanent magnet 11 moves down below the bearing plane of the apparatus. The apparatus having been wound up the frame 20 is urged by the coil spring 21 to assume the initial position.

Upon putting the apparatus onto the surface being gauged with its bearing surface the free end of the gauging permanent magnet 11 gets flush with said bearing surface, while the first balanced lever 10 rotates through an angle enough for the brake wheel 4 to release from contact with the pin 5. Thus, the wheel system of the apparatus is free to rotate under the action of the spring actuator 2. The central shaft 7 rotates along with the wheel system so as to twist the inner end of the first coiled spring 9 until the torque on said spring becomes high enough to break away the gauging permanent magnet 11 from the product being gauged.

At the instance when the gauging permanent magnet 11 gets broken away from the surface being gauged the balanced arm 10 rotates round its axis so that the brake spring 6 held thereto gets in contact with the brake wheel 4 to stop its rotation and hence the rotation of the central shaft 7 carrying the pointer 23.

If the torque developed by the first coiled spring 9 at a maximum possible angle of twist thereof proves to be too low for the measuring permanent magnet 11 to break away from the surface being gauged, one must put in action the second, stiffer spring 15 by turning the flywheel 13 to a preset angle with respect to the apparatus casing 1. The torque developed by the second coiled spring 15 as a result, is applied to the first balanced lever 10 through the second balanced lever 16 at the point of contact of both levers.

When testing duplicate products of mass production absolute measurements of the coating thickness need not be resorted to at all times, so it is quite enough to determine whether the coating thickness falls within the margin of tolerance.

Index marks 24 (FIGS. 1, 2) are provided on the circular scale 23 to indicate the tolerance zone, which are set by independent rotation and locking of sliding rings 25, 26 with respect to the gauge apparatus 1.

What is claimed is:

1. An apparatus for gauging the thickness of coatings on metal products, comprising:
    a casing;
    a wheel system accommodated in said casing and having a central shaft supporting a wheel of the system;
    spring actuator means connected to one of the members of said wheel system, said spring actuator means, when wound up, exerting a biasing force for rotating said wheel system;
    a gauging permanent magnet adapted to interact, by virtue of its field, with a ferromagnetic coating of the product, or with the base thereof in case of a nonmagnetic coating;
    two balanced levers;
    the first of said balanced levers carrying said gauging permanent magnet;
    the second of said balanced levers adapted to interact with said first balanced lever in cases where a break away force of said first lever is not high enough to break away said gauging permanent magnet from the product being gauged;
    two coiled springs;
    the first of said coiled springs connected through one of its ends to said first balanced lever, and through its other end, to one of the shafts of said wheel system, said first coiled spring exerting a break away force on said first balanced lever tending to overcome the magnetic attraction between said gauging permanent magnet and the product being gauged to thereby break said gauging permanent magnet away from the product, rotation of said wheel system by said spring actuator means increasing the break away force;

the second of said coiled springs connected through one of its ends to said second balanced lever, and through its other end, to said casing in such a manner as to adjust the spring tension;

a magnetic element made fast on said casing and adapted to attract said gauging permanent magnet after its having been broken away from the product being gauged;

a reset lever to bring said first balanced lever into an initial position prior to gauging a product, said reset lever being locked-in with the central shaft of said wheel system;

means for winding up said spring actuator means comprising a movable lever, an intermediate member adapted to get in mesh with said spring actuator means and locked-in with said movable lever, and a spring-actuated frame mounted on said casing traversably with respect thereto and adapted to contact the free end of said movable lever while traversing so as to turn the latter;

a circular scale rigidly fixed in position on said casing; and a pointer set on the central shaft of said wheel system to indicate the gauged thickness on said circular scale.

* * * * *